(12) United States Patent
Li

(10) Patent No.: US 6,888,971 B2
(45) Date of Patent: May 3, 2005

(54) MULTI-PORT CIRCULATOR

(75) Inventor: Wei-Zhong Li, San Jose, CA (US)

(73) Assignee: Oplink Communications, Inc., Fremont, CA (US)

( * ) Notice: Subject to any disclaimer, the term of this patent is extended or adjusted under 35 U.S.C. 154(b) by 0 days.

(21) Appl. No.: 10/859,329

(22) Filed: Jun. 1, 2004

(65) Prior Publication Data
US 2004/0218846 A1 Nov. 4, 2004

Related U.S. Application Data

(63) Continuation of application No. 10/075,432, filed on Feb. 12, 2002, now Pat. No. 6,751,366.

(51) Int. Cl.[7] .................................................. G02B 6/00
(52) U.S. Cl. ......................................... 385/11; 359/484
(58) Field of Search ............................. 385/14, 15, 18, 385/31, 147; 359/249, 281, 484, 488, 495, 618, 619

(56) References Cited

U.S. PATENT DOCUMENTS

| | | | | |
|---|---|---|---|---|
| 5,408,354 A | * | 4/1995 | Hosokawa | ................... 359/281 |
| 5,574,596 A | * | 11/1996 | Cheng | ......................... 359/484 |
| 5,909,310 A | * | 6/1999 | Li et al. | ...................... 359/484 |
| 6,246,807 B1 | * | 6/2001 | Lu et al. | ........................ 385/11 |
| 6,331,912 B1 | * | 12/2001 | Au-Yeung et al. | ........... 359/484 |

FOREIGN PATENT DOCUMENTS

CN        1251175 A        4/2000

* cited by examiner

Primary Examiner—Akm Enayet Ullah
(74) Attorney, Agent, or Firm—Fish & Richardson P.C.

(57) ABSTRACT

An extendable four-port circulator includes a middle birefringent crystal, a first birefringent crystal, a first non-reciprocal device, a second birefringent crystal, and a second non-reciprocal device. The first non-reciprocal device is coupled to the first birefringent crystal. The second non-reciprocal device is coupled to the second birefringent crystal. The middle birefringent crystal includes a first surface, a second surface, a third surface, and a fourth surface. The first surface is coupled to the first non-reciprocal device. The second surface is coupled to the second non-reciprocal device. The third surface defines first and second extension interfaces. The fourth surface defines third and fourth extension interfaces. A multi-port circulator includes at least one extendable four-port circulator.

11 Claims, 15 Drawing Sheets

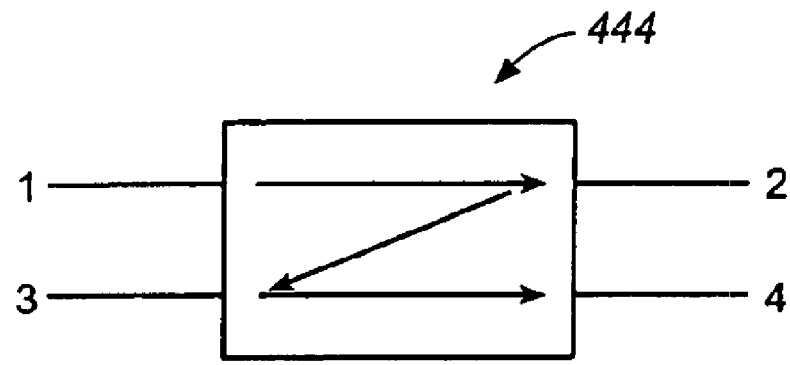
FIG._1
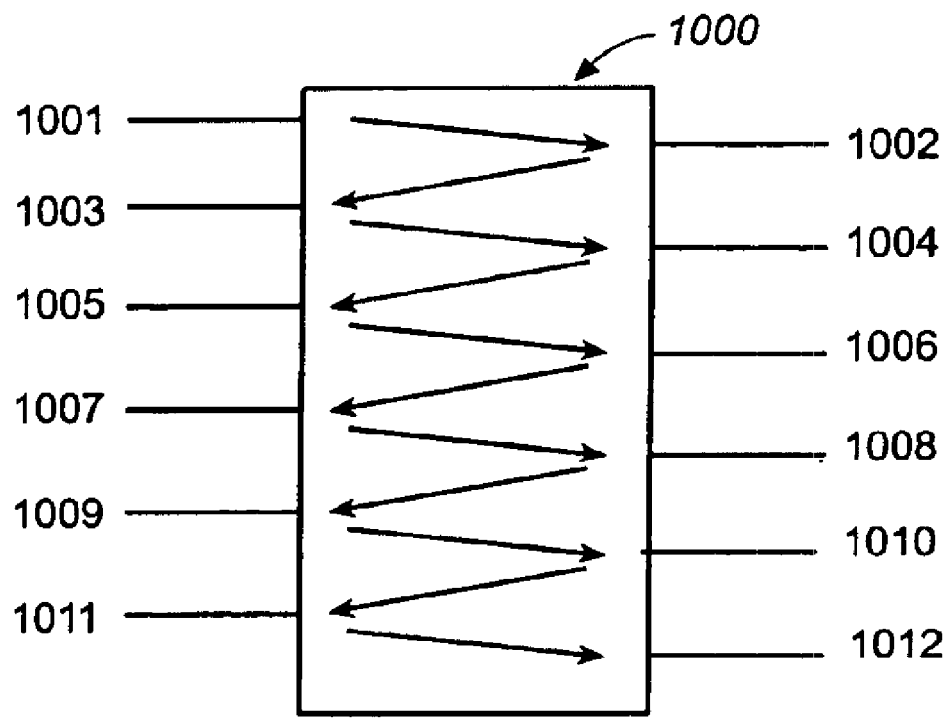
FIG._2a

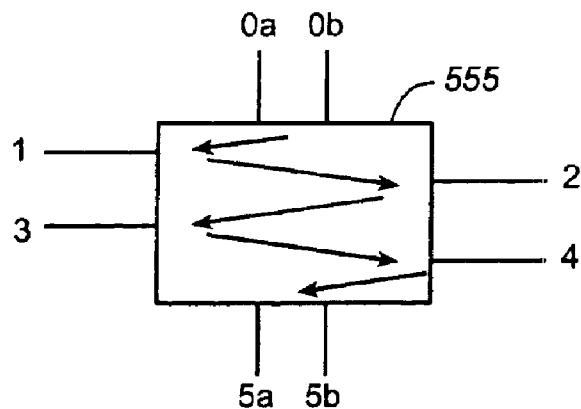
FIG._2b
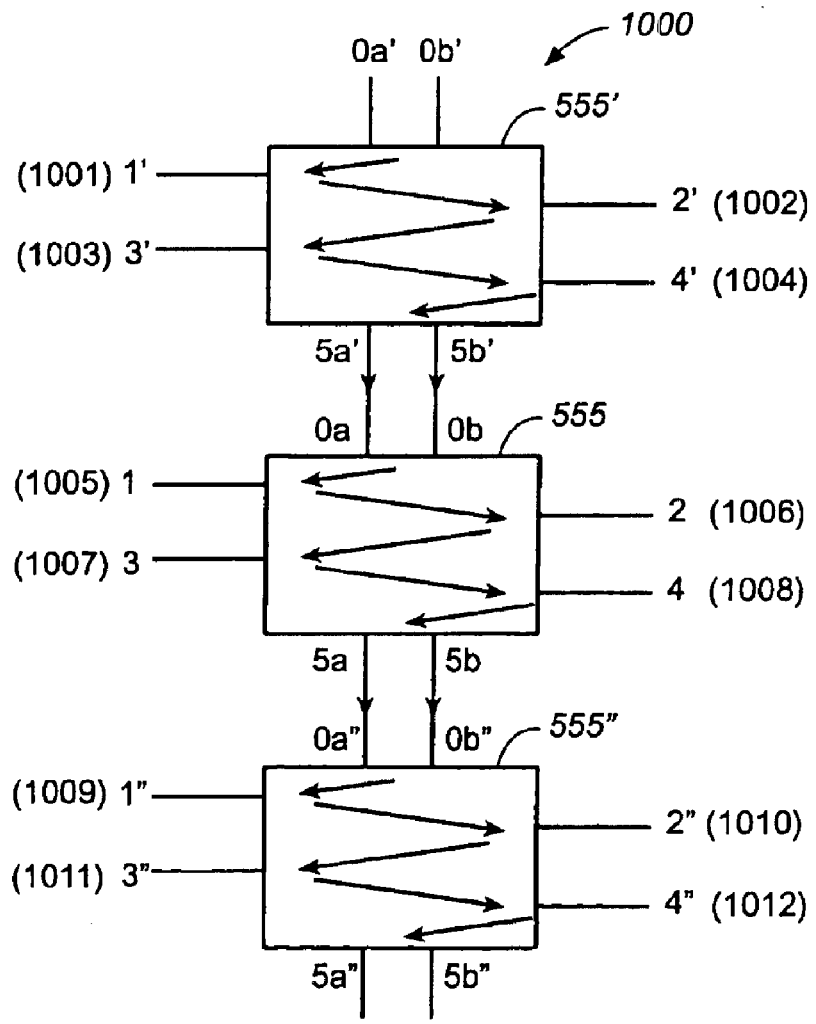
FIG._2c

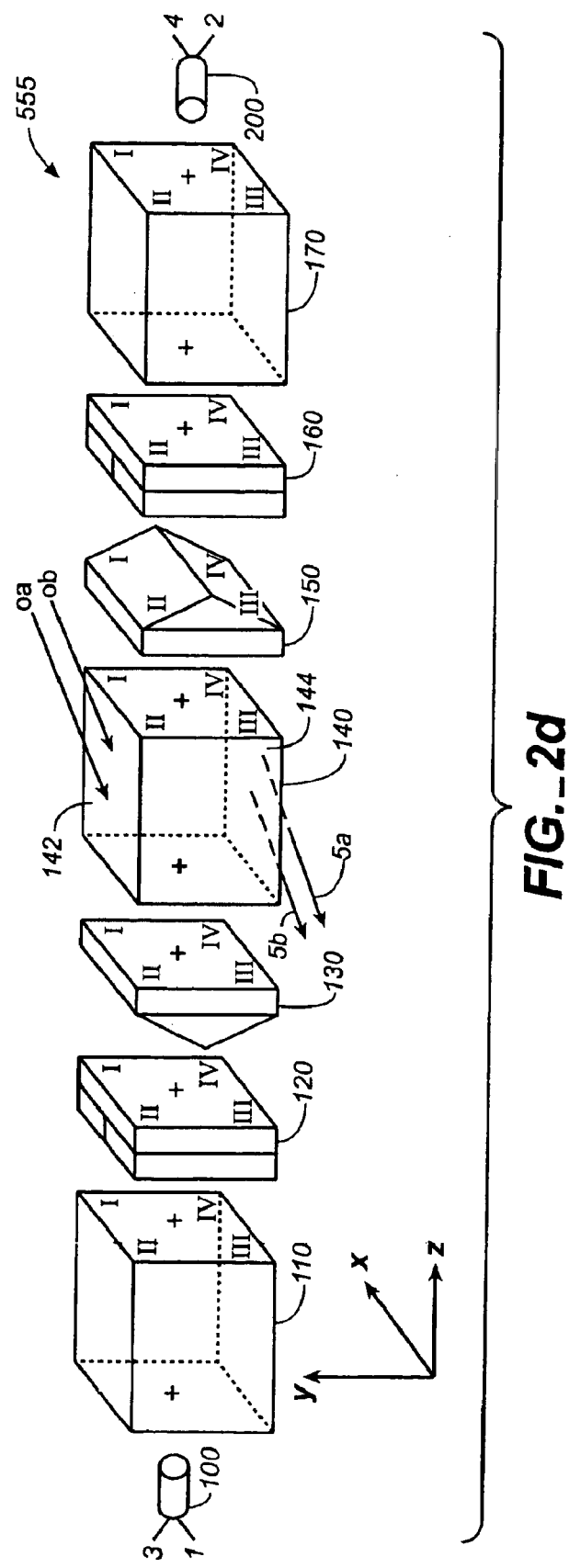
FIG._2d

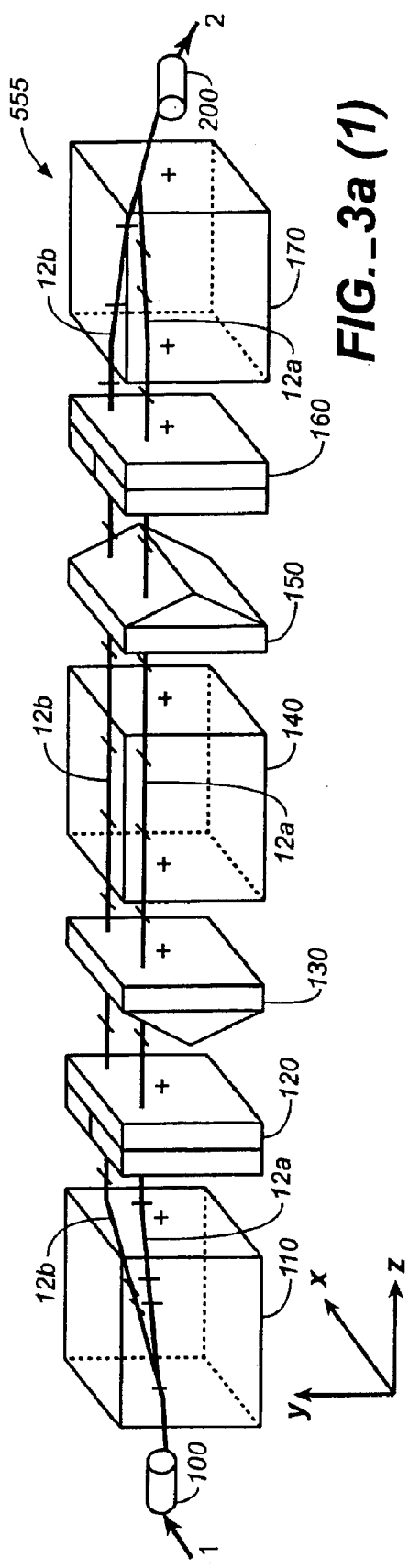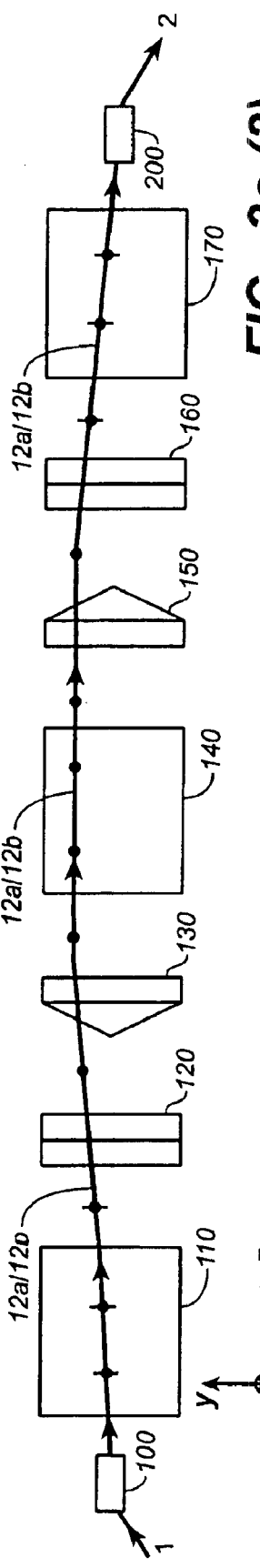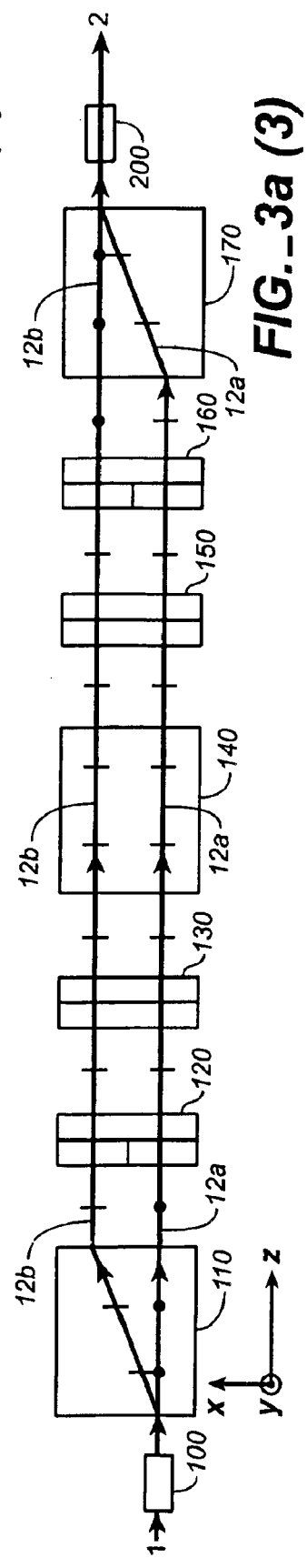
FIG._3a (1)   FIG._3a (2)   FIG._3a (3)

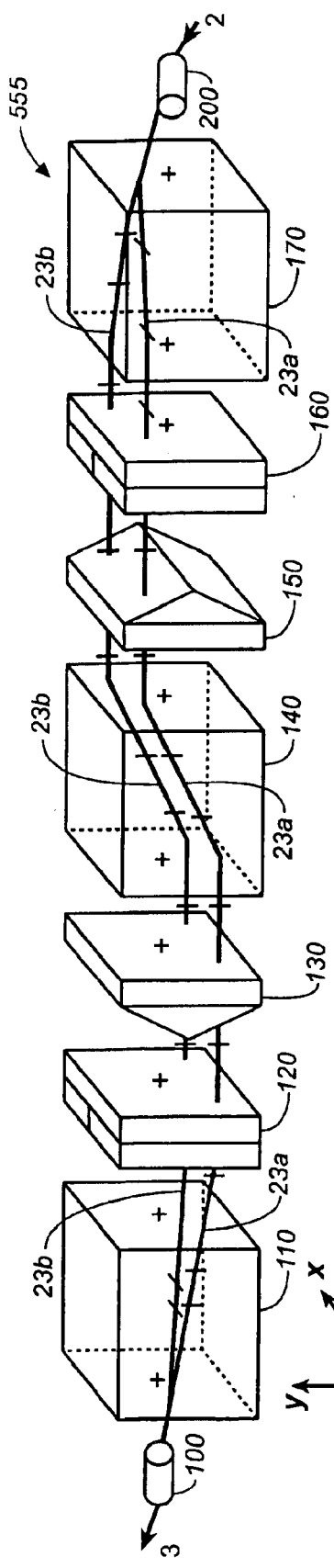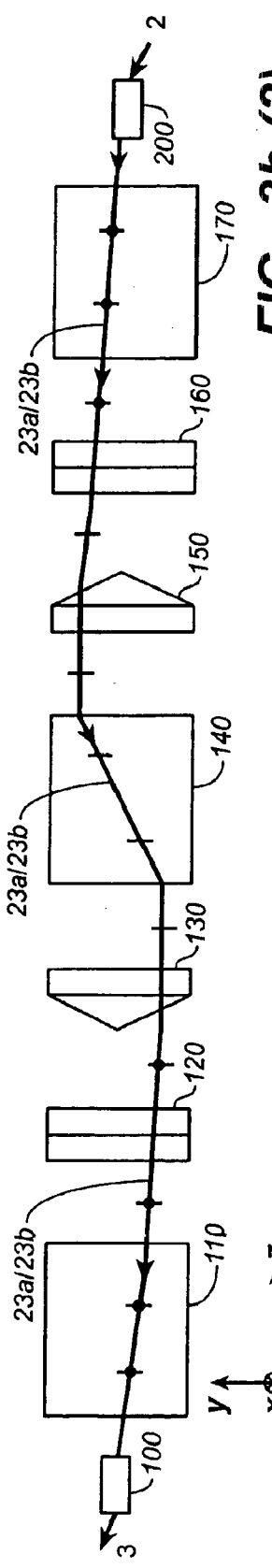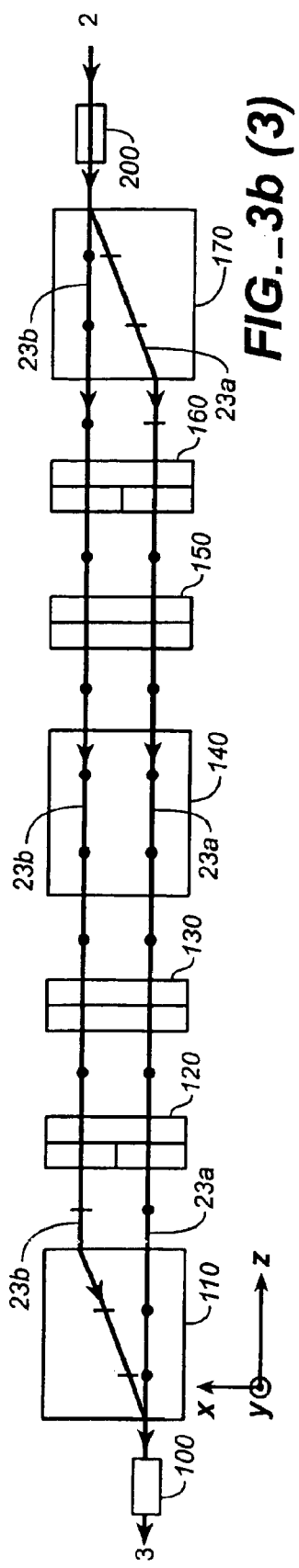
FIG._3b (1)
FIG._3b (2)
FIG._3b (3)

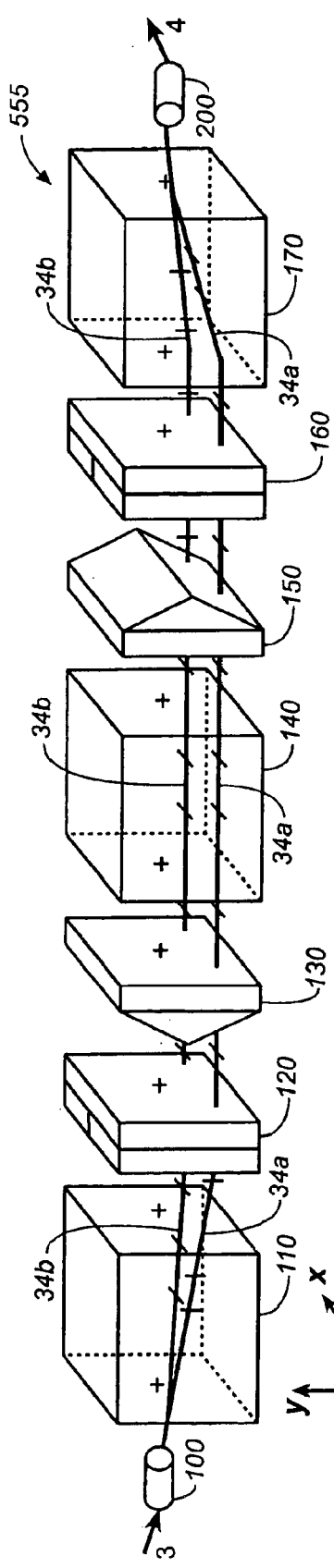
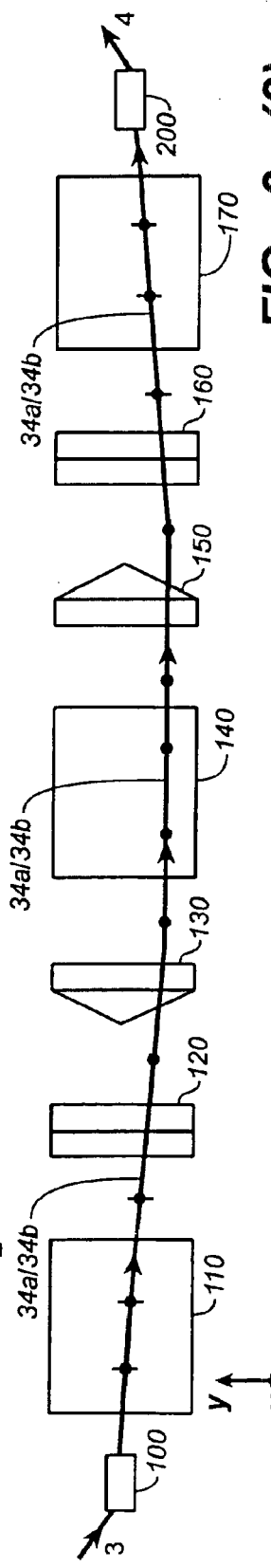
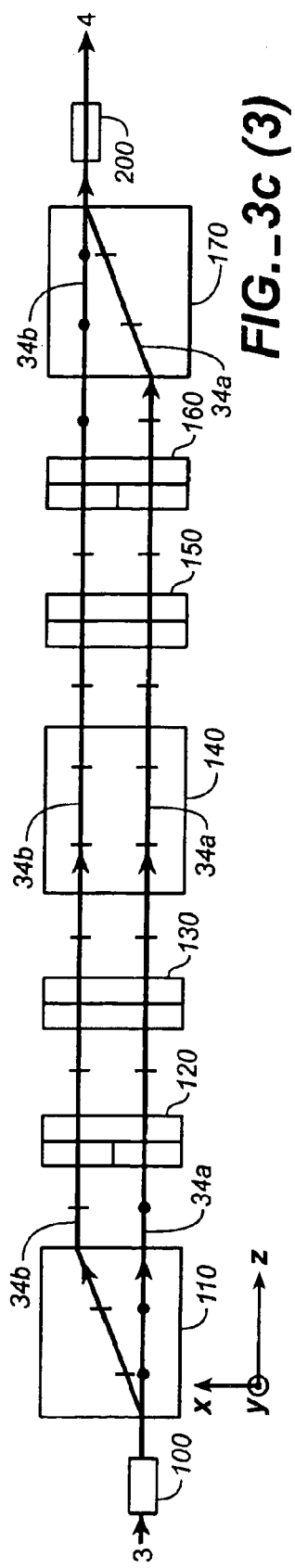
FIG._3c (1)   FIG._3c (2)   FIG._3c (3)

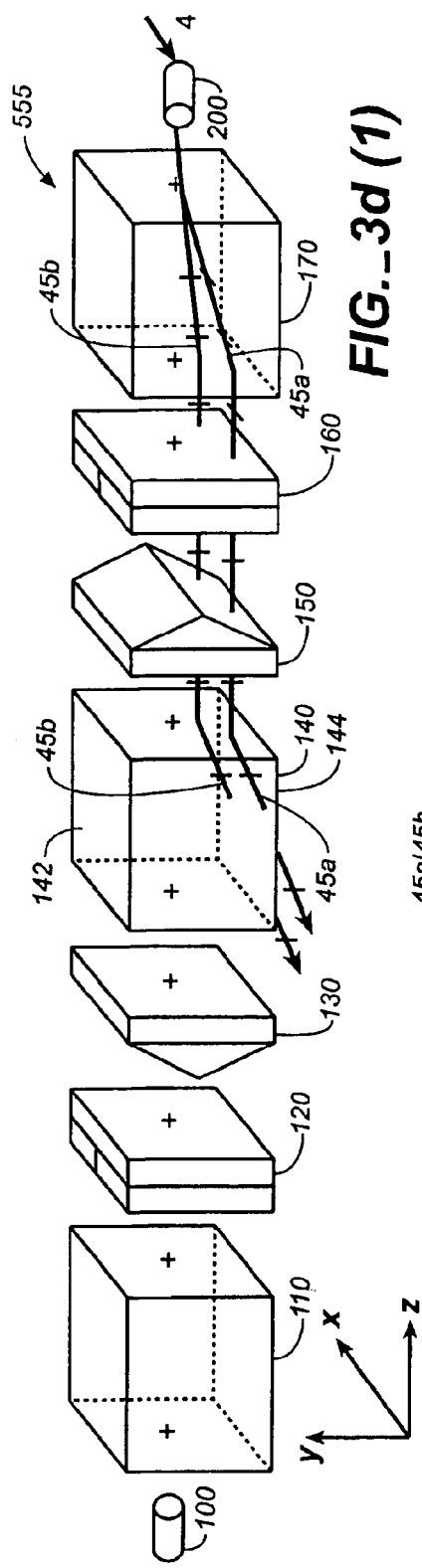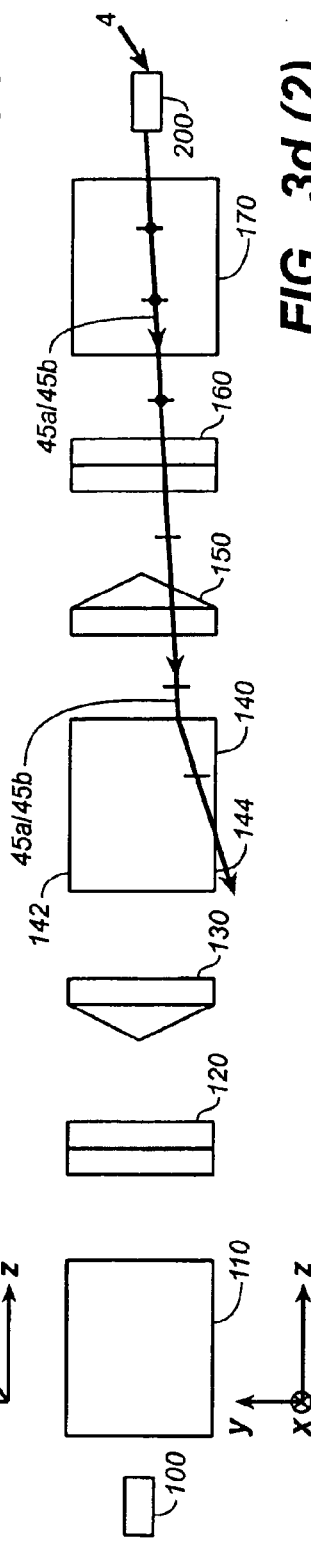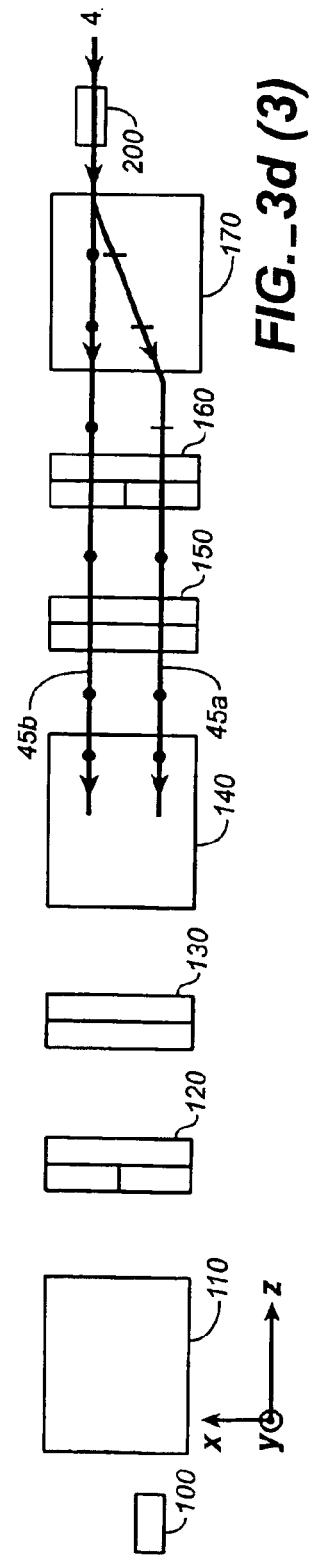

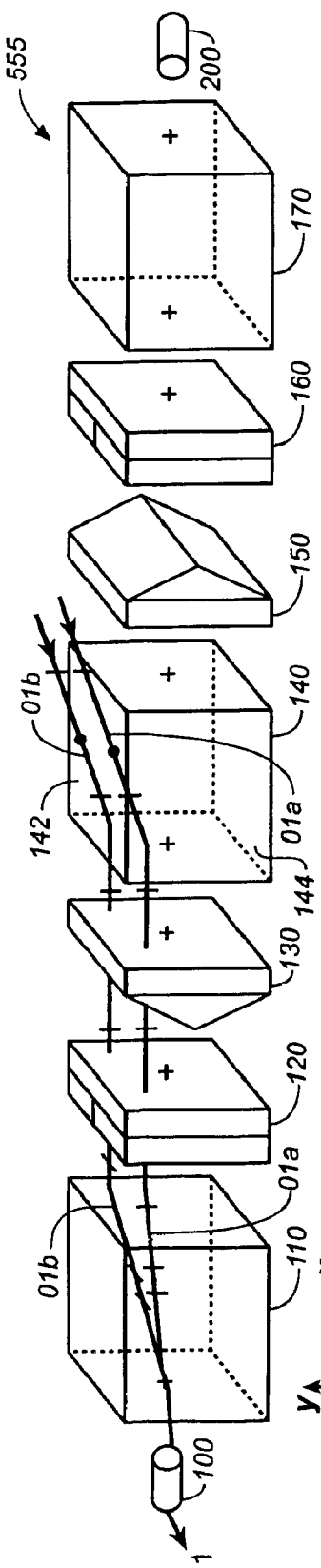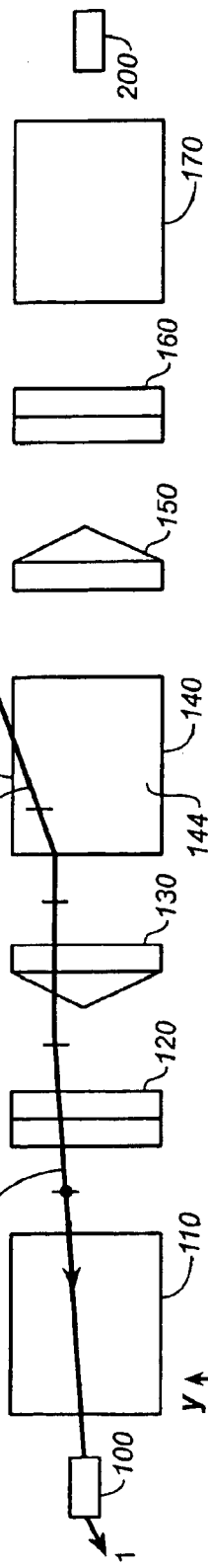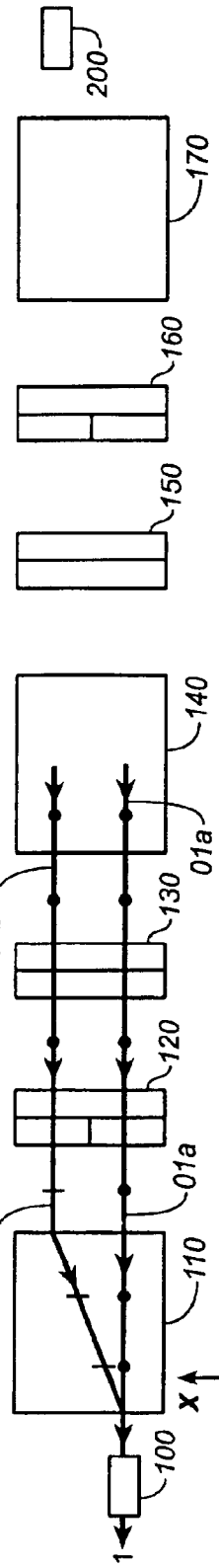
FIG._3e (1)
FIG._3e (2)
FIG._3e (3)

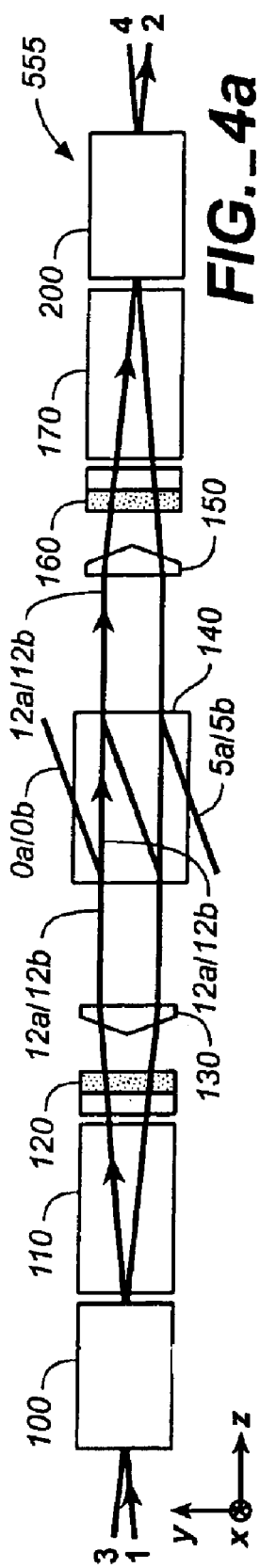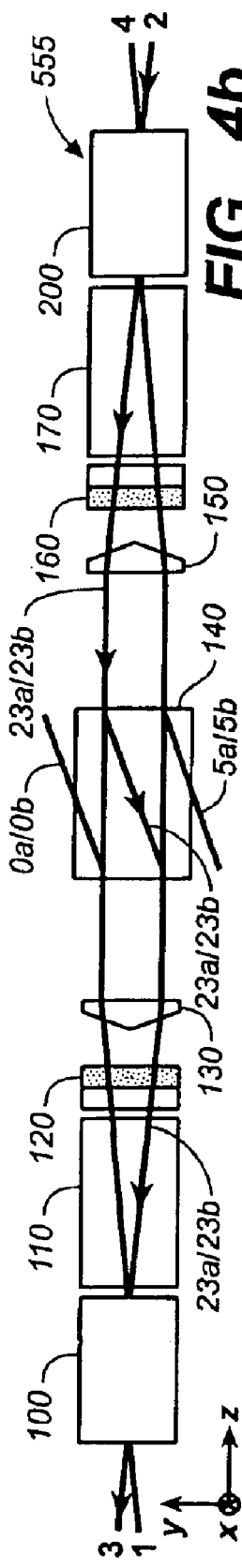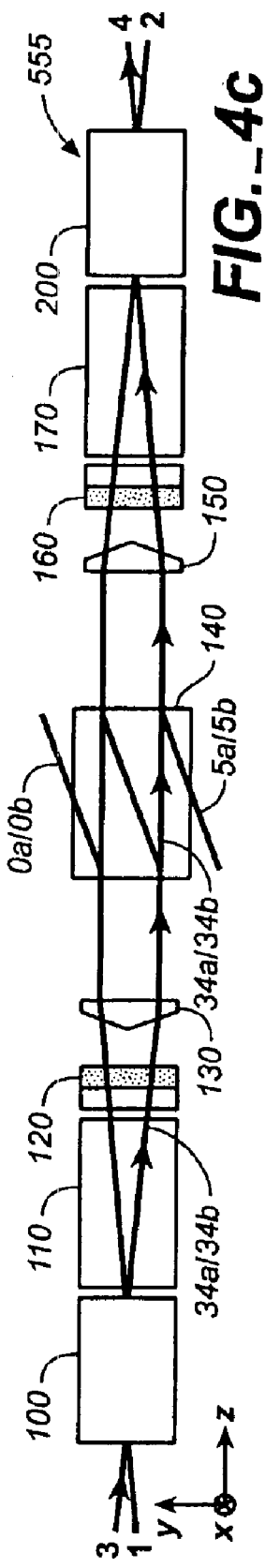

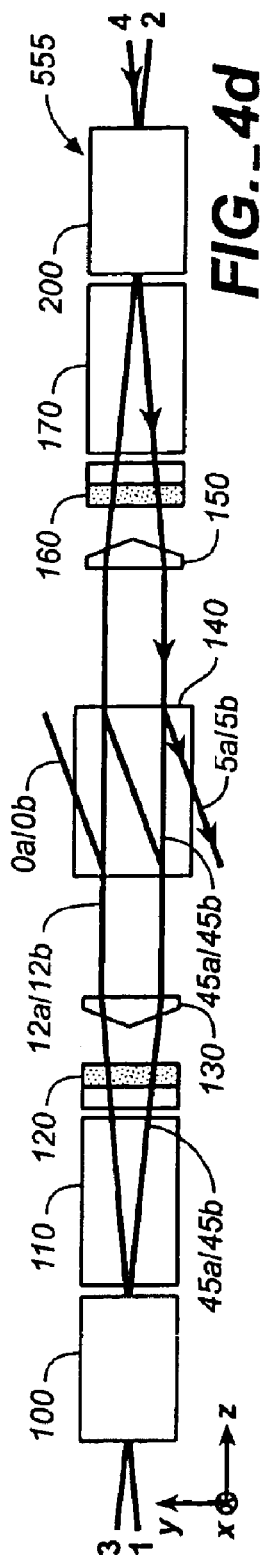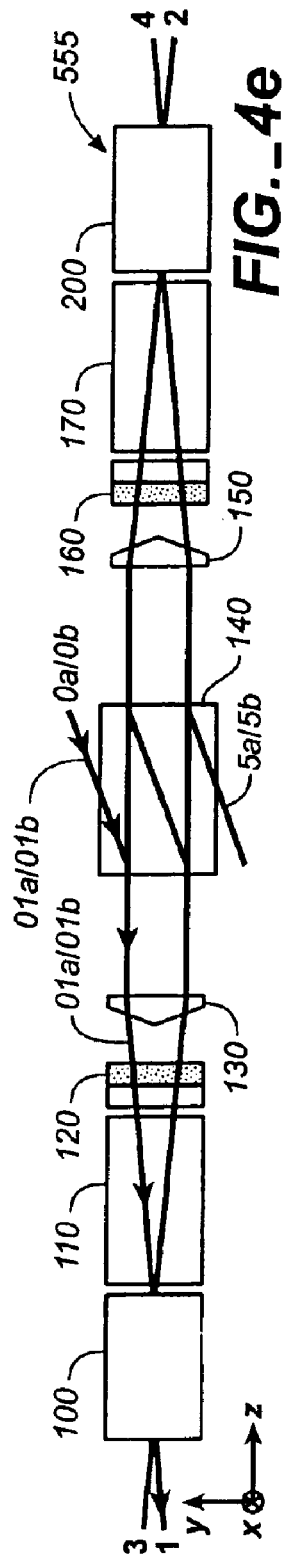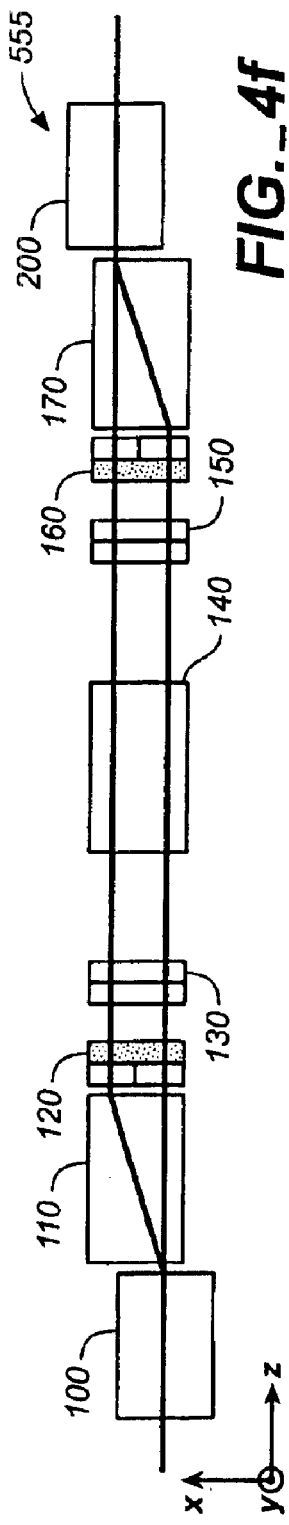

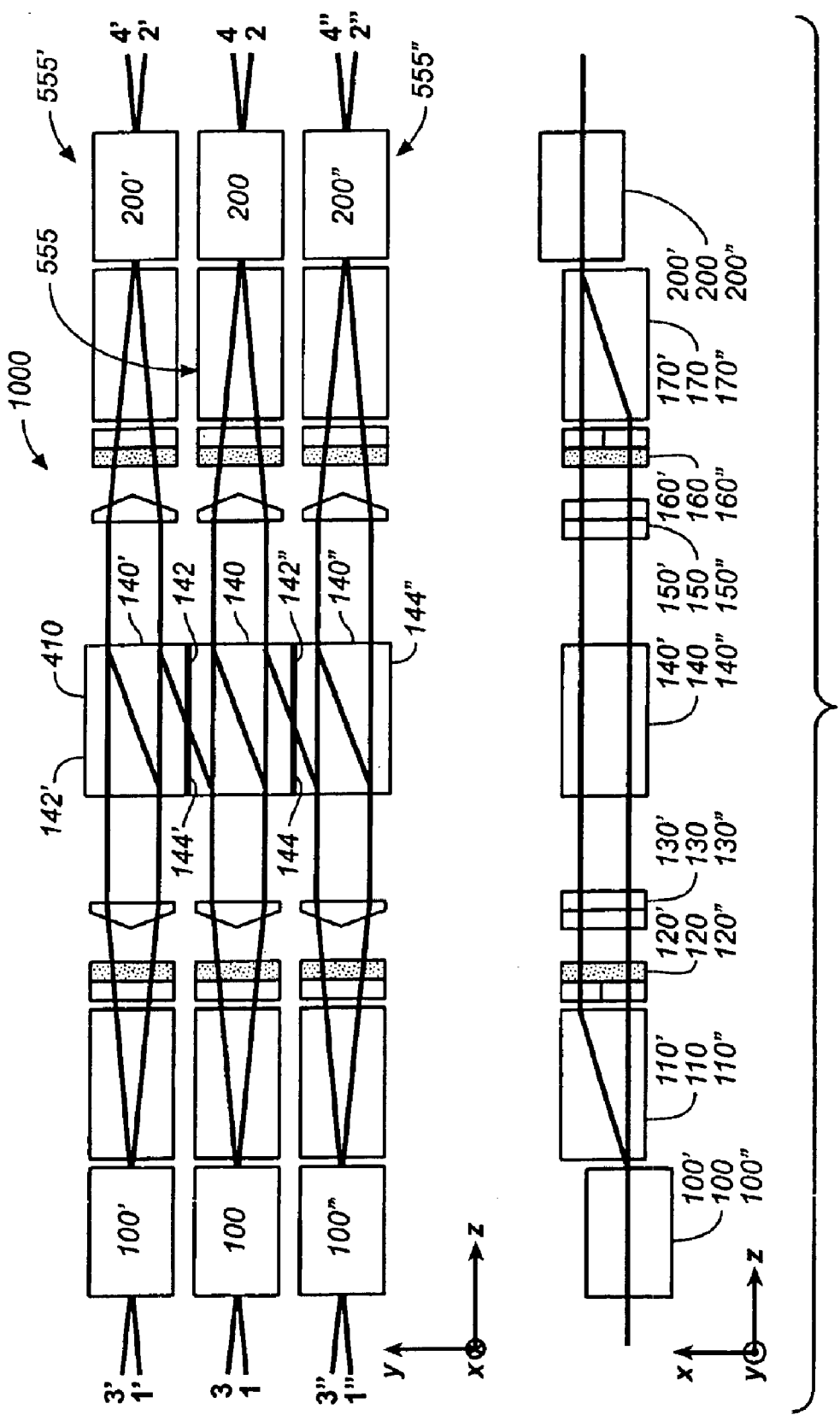
FIG._5

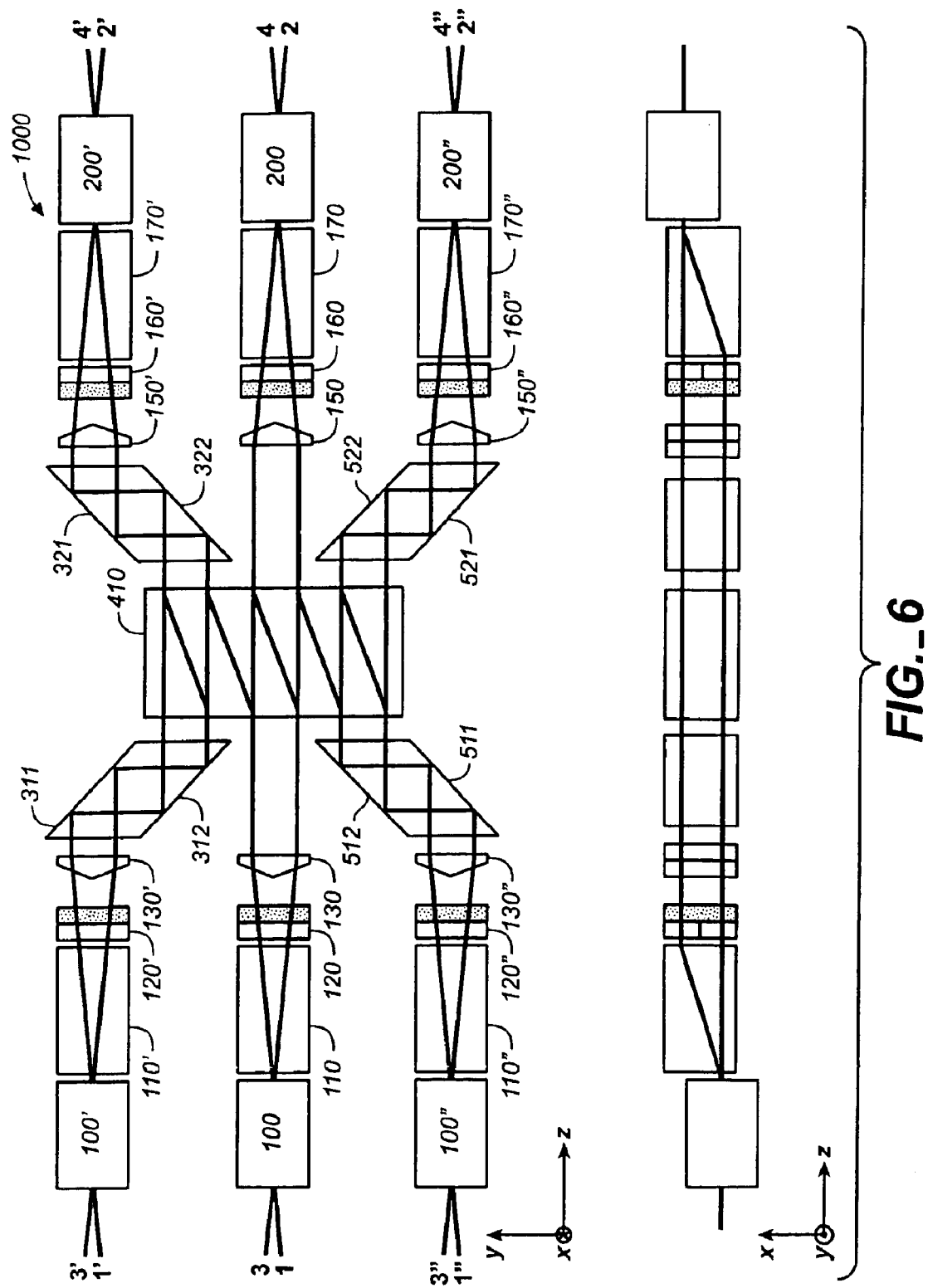
FIG._6

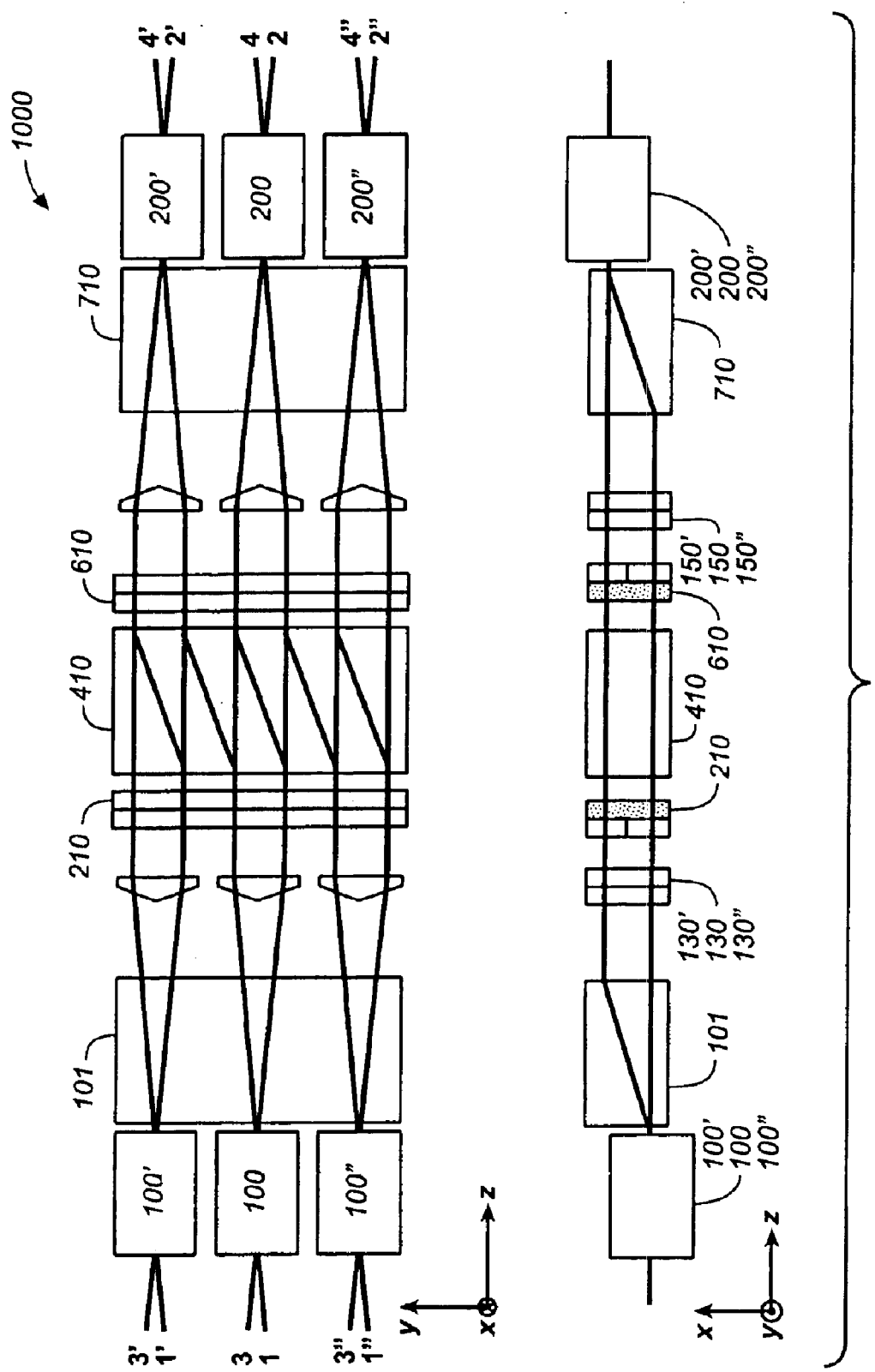
FIG._7

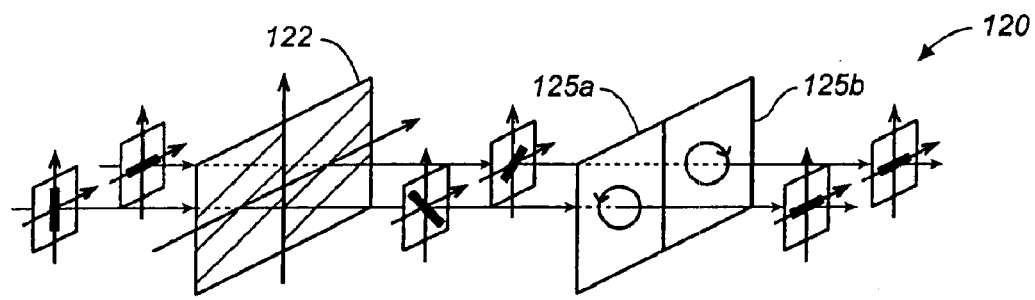
FIG._8a
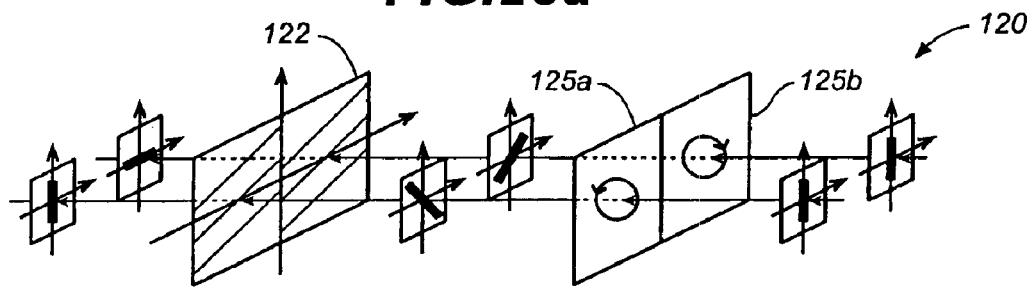
FIG._8b
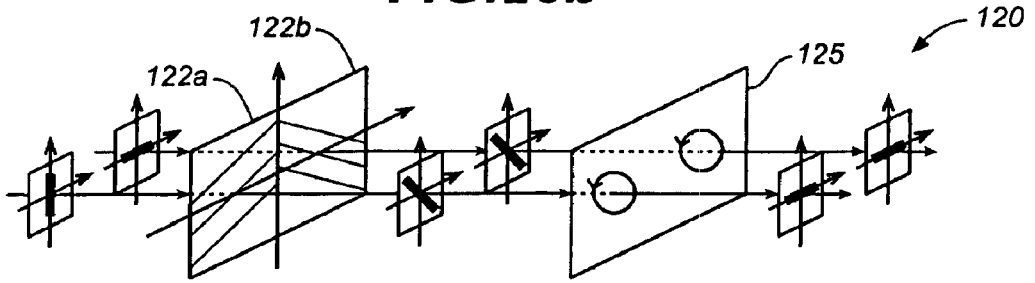
FIG._9a
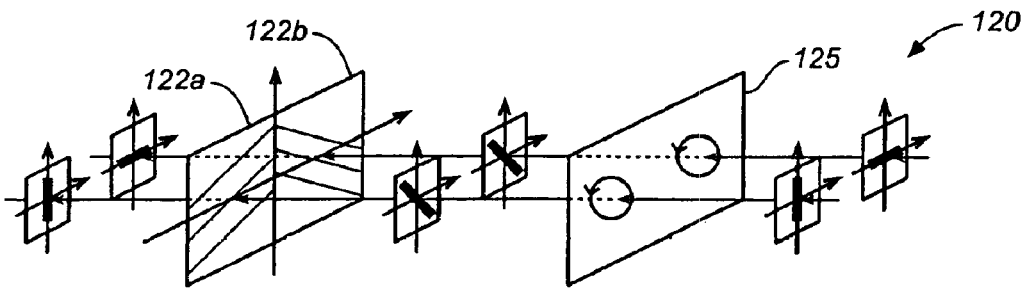
FIG._9b

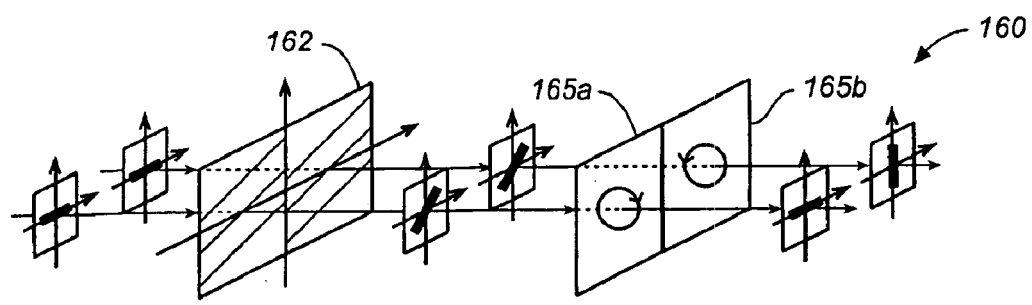
FIG._10a
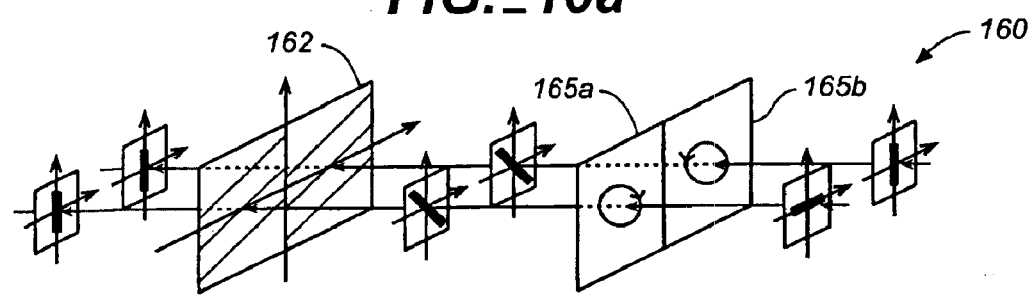
FIG._10b
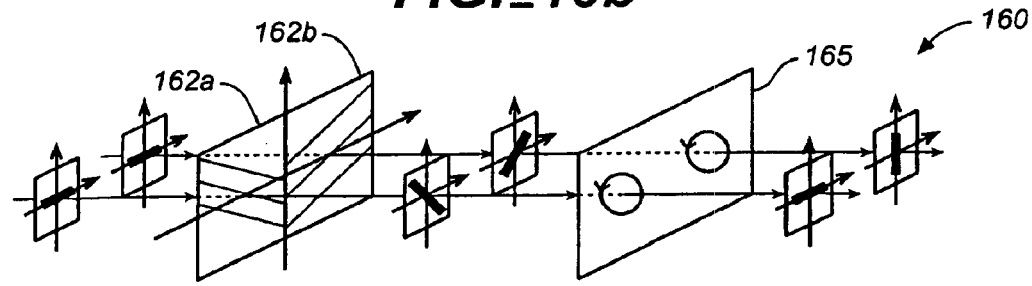
FIG._11a
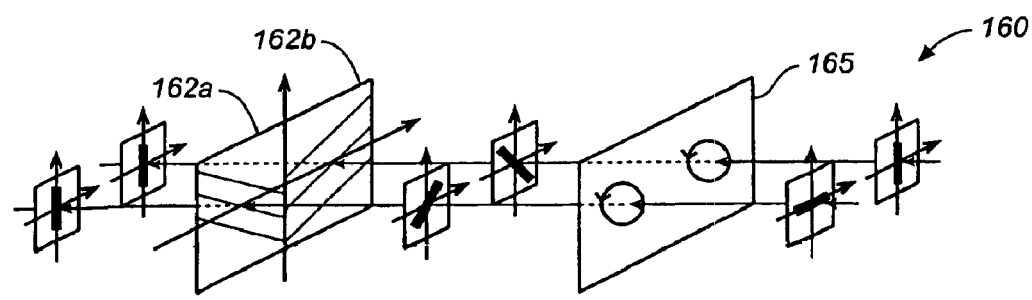
FIG._11b

MULTI-PORT CIRCULATOR

CROSS-REFERENCE TO RELATED APPLICATIONS

This application is a continuation application of and claims priority to U.S. application Ser. No. 10/075,432, filed on Feb. 12, 2002, now U.S. Pat. No. 6,751,366, the entire disclosures of which are incorporated herein by reference.

The present invention relates generally to optical technology.

BACKGROUND OF THE INVENTION

A circulator is often used with other optical devices to achieve certain optical functions. For example, a circulator can be used with a Brag Grating to extract an optical signal with a particular wavelength from a Wavelength Division Multiplexing ("WDM") optical signal. FIG. 1 shows a four-port circulator 444 with four ports 1, 2, 3, and 4. An optical signal entering port 1 exits from port 2, while an optical signal entering port 2 exits from port 3, and an optical signal entering port 3 exits from port 4.

SUMMARY OF THE INVENTION

In one aspect, the invention provides an extendable four-port circulator. The extendable four-port circulator includes a middle birefringent crystal, a first birefringent crystal, a first non-reciprocal device, a second birefringent crystal, and a second non-reciprocal device. The first non-reciprocal device is coupled to the first birefringent crystal. The second non-reciprocal device is coupled to the second birefringent crystal. The middle birefringent crystal includes a first surface, a second surface, a third surface, and a fourth surface. The first surface is coupled to the first non-reciprocal device. The second surface is coupled to the second non-reciprocal device. The third surface defines a first and a second extension interface. The fourth surface defines a third and a fourth extension interface.

In another aspect, the invention provides a multi-port circulator. The multi-port circulator includes a middle birefringent crystal, a first common non-reciprocal device, a second common non-reciprocal device, a first common birefringent crystal, and a second common birefringent crystal. The first common non-reciprocal device is coupled to the middle birefringent crystal. The second common non-reciprocal device is coupled to the middle birefringent crystal. The first common birefringent crystal is coupled to the first common non-reciprocal device. The second common birefringent crystal is coupled to the second common non-reciprocal device.

In another aspect, the invention provides a multi-port circulator. The multi-port circulator includes a middle birefringent crystal, a first and a second common non-reciprocal device, a first and a third side birefringent crystal, and a second and a fourth side birefringent crystal. The first and the second common non-reciprocal devices each are coupled to the middle birefringent crystal. The first and the third side birefringent crystals each are coupled to the first common non-reciprocal device. The second and the fourth side birefringent crystals each are coupled to the second common non-reciprocal device.

In another aspect, the invention provides a multi-port circulator. The multi-port circulator includes a middle birefringent crystal, a first and a third non-reciprocal device, a second and a fourth non-reciprocal device, a first side birefringent crystal, a second side birefringent crystal, a third side birefringent crystal, and a fourth side birefringent crystal. The first and the third non-reciprocal devices each are coupled to the middle birefringent crystal. The second and the fourth non-reciprocal devices each are coupled to the middle birefringent crystal. The first side birefringent crystal is coupled to the first non-reciprocal device. The second side birefringent crystal is coupled to the second non-reciprocal device. The third side birefringent crystal is coupled to the third non-reciprocal device. The fourth side birefringent crystal is coupled to the fourth non-reciprocal device.

Aspects of the invention can include one or more of the following advantages. An extendable four-port circulator in an implementation of the instant invention may be cascaded to form a multi-port circulator. Other advantages will be readily apparent from the attached figures and the description below.

BRIEF DESCRIPTION OF THE DRAWINGS

FIG. 1 shows a four-port circulator.

FIG. 2a illustrates a twelve-port circulator having ports 1001–1012.

FIG. 2b illustrates an extendable four-port circulator having four ports and four extension interfaces.

FIG. 2c illustrates three extendable four-port circulators cascaded together to form a twelve-port circulator.

FIG. 2d illustrates the position and orientation of the components of an extendable four port PM circulator shown in FIG. 2c.

FIG. 3a(1)–FIG. 3a(3) illustrate that an optical signal introduced at port 1 is separated into two light beams that are recombined to exit from port 2.

FIG. 3b(1)–FIG. 3b(3) illustrate that an optical signal introduced at port 2 is separated into two light beams that are recombined to exit from port 3.

FIG. 3c(1)–FIG. 3c(3) illustrate that an optical signal introduced at port 3 is separated into two light beams that are recombined to exit from port 4.

FIG. 3d(1)–FIG. 3d(3) illustrate that an optical signal introduced at port 4 is separated into two light beams that exit from two of the extension interfaces.

FIG. 3e(1)–FIG. 3e(3) illustrate that light beams entering two of the extension interfaces are combined to exit from port 1.

FIG. 4a–FIG. 4e summarize the optical paths in the y–z plane traveled by the light beams respectively in FIG. 3a–FIG. 3e.

FIG. 4f illustrates the optical paths in the x-z plane traveled by the light beams in FIG. 4a–FIG. 4e.

FIG. 5 illustrates three extendable four-port circulators of FIG. 2 cascaded together to form a twelve-port circulator.

FIGS. 6 and FIG. 7 illustrate alternative implementations of the twelve-port circulator of FIG. 5.

FIG. 8a and FIG. 8b illustrate an implementation of non-reciprocal device 120 having one half wave plate and two Faraday rotators.

FIG. 9a and FIG. 9b illustrate an implementation of non-reciprocal device 120 having two half wave plates and one Faraday rotator.

FIG. 10a and FIG. 10b illustrate an implementation of non-reciprocal device 160 having one half wave plate and two Faraday rotators.

FIG. 11a and FIG. 11b illustrate an implementation of non-reciprocal device 160 having two half wave plates and one Faraday rotator.

DETAILED DESCRIPTION OF THE INVENTION

The present invention relates to an improvement in optical technology. The following description is presented to enable one of ordinary skill in the art to make and use the invention and is provided in the context of a patent application and its requirements. Various modifications to the invention will be readily apparent to those skilled in the art and the generic principles herein may be applied to other embodiments. Thus, the present invention is not intended to be limited to the embodiments shown, but is to be accorded the widest scope consistent with the principles and features described herein.

The present invention will be described in terms of an extendable four-port circulator and a twelve-port circulator having specific components having specific configurations. Similarly, the present invention will be described in terms of components having specific relationships, such as distances or angles between components. However, one of ordinary skill in the art will readily recognize that this method and system will operate effectively for other components having similar properties, other configurations, and other relationships between components. In the instant application, the implementations of an extendable four-port circulator are described. Two extendable four-port circulators can be cascaded to form an eight-port circulator, and three extendable four-port circulators can be cascaded to form a twelve-port circulator.

FIG. 2a shows a twelve-port circulator 1000 that includes twelve ports 1001–1012. As shown in FIG. 2a, an optical signal entering port 1001 will exit from port 1002, and an optical signal entering port 1002 will exit from port 1003. Similarly, an optical signal entering port 1003, 1004, 1005, 1006, 1007, 1008, 1009, 1010, and 1011 will exit, respectively, from port 1004, 1005, 1006, 1007, 1008, 1009, 1010, 1011, and 1012.

Twelve-port circulator 1000 can be constructed with a number of different methods. One possible implementation of a twelve-port circulator is to cascade three extendable four-port circulators. An extendable four-port circulator 555 described in the instant application is shown in FIG. 2b. Extendable four-port circulator 555 includes four ports 1, 2, 3, and 4, along with extension interfaces 0a, 0b, 5a, and 5b. An optical signal entering port 1 will exit from port 2, an optical signal entering port 2 will exit from port 3, and an optical signal entering port 3 will exit from port 4. In addition, an optical signals entering extension interfaces 0a and 0b will be merged and exit from port 1, and an optical signal entering port 4 will be split into two optical signals exiting respectively from ports 5a and 5b.

FIG. 2c shows that three extendable four-port circulators 555', 555, and 555" are cascaded together to form a twelve-port circulator 1000. Interfaces 5a' and 5b' of circulator 555' are respectively coupled to interfaces 0a and 0b of circulator 555, and interfaces 5a and 5b of circulator 555 are respectively coupled to interfaces 0a" and 0b" of circulator 555". Ports 1', 2', 3', and 4' of four-port circulator 555' are respectively equivalent to ports 1001, 1002, 1003, and 1004 of twelve-port circulator 1000; ports 1, 2, 3, and 4 of four-port circulator 555 are respectively equivalent to ports 1005, 1006, 1007, and 1008 of twelve-port circulator 1000; and ports 1", 2", 3", and 4" of four-port circulator 555" are respectively equivalent to ports 1009, 1010, 1011, and 1012 of twelve-port circulator 1000.

FIG. 2d illustrates an implementation of an extendable four-port circulator 555. Circulator 555 includes dual fiber collimator 100, birefringent crystal 110, non-reciprocal device 120, wedge 130, birefringent crystal 140, wedge 150, non-reciprocal device 160, birefringent crystal 170, and dual fiber collimator 200. Each of dual fiber collimators 100 and 200 can be coupled to two fibers (not shown). Circulator 555 includes four ports 1, 2, 3, and 4, along with extension interfaces 0a, 0b, 5a, and 5b. Two couplings at collimator 100 constitute respectively ports 1 and 3, and two couplings at collimator 200 constitute respectively ports 2 and 4. Two areas on surface 142 of birefringent crystal 140 constitute extension interfaces 0a and 0b, and two areas on surface 144 of birefringent crystal 140 constitute extension interfaces 5a and 5b.

A light beam may enter one of four regions of a given component in extendable four-port circulator 555. The four regions are labeled as quadrant I, II, III, and IV, as shown in FIG. 2d. The x-direction, y-direction and the z-direction are also shown in the figure. The positive z-direction is along the propagation direction of a light beam introduced at dual fiber collimator 100.

FIGS. 3a(1), 3a(2), and 3a(3) illustrate that an optical signal introduced at port 1 is separated into light beams 12a and 12b. Light beams 12a and 12b are recombined and exit from port 2. FIG. 3a(1) is a perspective view, FIG. 3a(2) is a planar view on the y-z plane, and FIG. 3a(3) is a planar view on the x-z plane.

The optical signal introduced at port 1 is separated into light beam 12a with the y-polarization and light beam 12b with the x-polarization in birefringent crystal 110. Light beam 12a is not deflected and exits from quadrant II of birefringent crystal 110. Light beam 12b is deflected in the positive x-direction and exits from quadrant I of birefringent crystal 110. After exiting from birefringent crystal 110, light beams 12a and 12b travel in the positive z-direction and somewhat in the positive y-direction.

Light beam 12a enters quadrant II of non-reciprocal device 120 with the y-polarization, and exits from quadrant II with the x-polarization. After passing through quadrant II of wedge 130, light beam 12a is deflected to travel essentially in alignment with the positive z-direction. Light beam 12a then passes through quadrant II of birefringent crystal 140, without being deflected. After passing through quadrant II of wedge 150, light beam 12a is deflected to travel in the positive z-direction and somewhat in the negative y-direction (FIG. 3a(2)). Thereafter, light beam 12a enters quadrant II of non-reciprocal device 160 with the x-polarization and exits from quadrant II with the x-polarization. Finally, light beam 12a enters quadrant II of birefringent crystal 170, is deflected in the positive x-direction, and enters dual fiber collimator 200 with the x-polarization.

Light beam 12b enters quadrant I of non-reciprocal device 120 with the x-polarization, and exits from quadrant I with the x-polarization. After passing through quadrant I of wedge 130, light beam 12b is deflected to travel essentially in alignment with the positive z-direction. Light beam 12b then passes through quadrant I of birefringent crystal 140, without being deflected. After passing through quadrant I of wedge 150, light beam 12b is deflected to travel in the positive z-direction and somewhat in the negative y-direction (FIG. 3a(2)). Thereafter, light beam 12b enters quadrant I of non-reciprocal device 160 with the x-polarization, and exits from quadrant I with the y-polarization. Finally, light beam 12b passes through quadrant I of birefringent crystal 170, without being deflected, and enters dual fiber collimator 200 with the y-polarization.

Light beams 12a and 12b enter collimator 200 respectively with the x-polarization and the y-polarization, are combined at collimator 200, and exit from port 2.

FIGS. 3b(1), 3b(2), and 3b(3) illustrate that an optical signal introduced at port 2 is separated into light beams 23a and 23b. Light beams 23a and 23b are recombined and exit from port 3. FIG. 3b(1) is a perspective view, FIG. 3b(2) is a planar view on the y-z plane, and FIG. 3b(3) is a planar view on the x-z plane.

The optical signal introduced at port 2 is separated into light beam 23a with the x-polarization and light beam 23b with the y-polarization. Light beam 23a is deflected in the negative x-direction and exits from quadrant II of birefringent crystal 170. Light beam 23b is not deflected and exits from quadrant I of birefringent crystal 170. After exiting from birefringent crystal 170, light beams 23a and 23b travel in the negative z-direction and somewhat in the positive y-direction (FIG. 3b(2)).

Light beam 23a enters quadrant II of non-reciprocal device 160 with the x-polarization, and exits from quadrant II with the y-polarization. After passing through quadrant II of wedge 150, light beam 23a is deflected to travel essentially in alignment with the negative z-direction. Light beam 23a then enters quadrant II of birefringent crystal 140, is deflected in the negative y-direction, and exits from quadrant III of birefringent crystal 140. After passing through quadrant III of wedge 130, light beam 23a is deflected to travel in the negative z-direction and somewhat in the positive y-direction. Thereafter, light beam 23a enters quadrant III of non-reciprocal device 120 with the y-polarization, and exits from quadrant III with the y-polarization. Finally, light beam 23a passes through quadrant III of birefringent crystal 110, without being deflected, and enters dual fiber collimator 100 with the y-polarization.

Light beam 23b enters quadrant I of non-reciprocal device 160 with the y-polarization, and exits from quadrant I with the y-polarization. After passing through quadrant I of wedge 150, light beam 23b is deflected to travel essentially in alignment with the negative z-direction. Light beam 23a then enters quadrant I of birefringent crystal 140, is deflected in the negative y-direction, and exits from quadrant IV of birefringent crystal 140. After passing through quadrant IV of wedge 150, light beam 23b is deflected to travel in the negative z-direction but leaning toward the positive y-direction. Thereafter, light beam 23b enters quadrant IV of non-reciprocal device 120 with the y-polarization, and exits the x-polarization. Finally, light beam 23b enters quadrant IV of birefringent crystal 110, is deflected in the negative x-direction, and enters dual fiber collimator 100 with the x-polarization.

Light beams 23a and 23b enter collimator 100 respectively with the y-polarization and the x-polarization, are combined at collimator 100, and exit from port 3.

FIGS. 3c(1), 3c(2), and 3c(3) illustrate that an optical signal introduced at port 3 is separated into light beams 34a and 34b. Light beams 34a and 34b are recombined and exit from port 4. FIG. 3c(1) is a perspective view, FIG. 3c(2) is a planar view on the y-z plane, and FIG. 3c(3) is a planar view on the x-z plane.

The optical signal introduced at port 3 is separated into light beam 34a with the y-polarization and light beam 34b with the x-polarization by birefringent crystal 110. Light beam 34a is not deflected and exits from quadrant III of birefringent crystal 110. Light beam 34b is deflected in the positive x-direction and exits from quadrant IV of birefringent crystal 110. After exiting from birefringent crystal 110, light beams 34a and 34b travel in the positive z-direction and somewhat in the negative y-direction (FIG. 3c(2)).

Light beam 34a enters quadrant III of non-reciprocal device 120 with the y-polarization, and exits from quadrant III with the x-polarization. After passing through quadrant III of wedge 130, light beam 34a is deflected to travel essentially in alignment with the positive z-direction. Light beam 34a then passes through quadrant III of birefringent crystal 140, without being deflected. After passing through quadrant III of wedge 150, light beam 34a is deflected to travel in the positive z-direction and somewhat in the positive y-direction. Thereafter, light beam 34a enters quadrant III of non-reciprocal device 160 with the x-polarization, and exits from quadrant III with the x-polarization. Finally, light beam 34a enters quadrant II of birefringent crystal 170, is deflected in the positive x-direction, and enters dual fiber collimator 200 with the x-polarization.

Light beam 34b enters quadrant IV of non-reciprocal device 120 with the x-polarization, and exits from quadrant I with the x-polarization. After passing through quadrant IV of wedge 130, light beam 34b is deflected to travel essentially in alignment with the positive z-direction. Light beam 34b then passes through quadrant IV of birefringent crystal 140, without being deflected. After passing through quadrant IV of wedge 150, light beam 34b is deflected to travel in the positive z-direction and somewhat in the positive y-direction (FIG. 3c(2)). Thereafter, light beam 34b enters quadrant IV of non-reciprocal device 160 with the x-polarization, and exits from quadrant IV with the y-polarization. Finally, light beam 34b passes through quadrant IV of birefringent crystal 170, and enters dual fiber collimator 200 with the y-polarization.

Light beams 34a and 34b enter collimator 200 respectively with the x-polarization and the y-polarization, are combined at collimator 200, and exit from port 4.

FIGS. 3d(1), 3d(2), and 3d(3) illustrate that an optical signal introduced at port 4 is separated into light beams 45a and 45b. Light beams 45a and 45b exit respectively from extension interfaces 5a and 5b. FIG. 3d(1) is a perspective view, FIG. 3d(2) is a planar view on the y-z plane, and FIG. 3d(3) is a planar view on the x-z plane.

The optical signal introduced at port 4 on dual fiber collimator 200 is separated into light beam 45a with the x-polarization and light beam 45b with the y-polarization by birefringent crystal 170. Light beam 45a is deflected in the negative x-direction and exits from quadrant III of birefringent crystal 170. Light beam 45b is not deflected and exits from quadrant IV of birefringent crystal 170. After exiting from birefringent crystal 170, light beams 45a and 45b travel in the negative z-direction and somewhat in the negative y-direction (FIG. 3d(2)).

Light beam 45a enters quadrant III of non-reciprocal device 160 with the x-polarization, and exits from quadrant III with the y-polarization. After passing through quadrant III of wedge 150, light beam 45a is deflected to travel essentially in alignment with the negative z-direction. Light beam 45a then enters quadrant III of birefringent crystal 140, is deflected in the negative y-direction, and exits with the y-polarization from extension interface 5a on surface 144 of birefringent crystal 140.

Light beam 45b enters quadrant IV of non-reciprocal device 160 with the y-polarization, and exits from quadrant IV with the y-polarization. After passing through quadrant IV of wedge 150, light beam 45b is deflected to travel essentially in alignment with the negative z-direction. Light beam 45b then enters quadrant IV of birefringent crystal 140, is deflected in the negative y-direction, and exits from extension interface 5b on surface 144 of birefringent crystal 140 with the y-polarization.

FIGS. 3e(1), 3e(2), and 3e(3) illustrate that light beams 01a and 01b enter respectively extension interfaces 0a and 0b of extendable four-ports circulator 555, are combined, and exit from port 1. FIG. 3e(1) is a perspective view, FIG. 3e(2) is a planar view on the y-z plane, and FIG. 3e(3) is a planar view on the x-z plane.

Light beam 01a enters extension interface 0a on surface 142 of birefringent crystal 140 with the y-polarization, and exits from quadrant II of birefringent crystal 140 in a direction that is in alignment with the negative z-direction. After passing through quadrant II of wedge 130, light beam 01a is deflected to travel in a direction that resembles the negative z-direction but leaning toward the negative y-direction (FIG. 3e(2)). Thereafter, light beam 01a enters quadrant II of non-reciprocal device 120 with the y-polarization, and exits from quadrant II with the y-polarization. Finally, light beam 01b passes through quadrant I of birefringent crystal 110, without being deflected, and enters dual fiber collimator 100 with the y-polarization.

Light beam 01b enters extension interface 0b on surface 142 of birefringent crystal 140 with the y-polarization, and exits from quadrant I of birefringent crystal 140 in the negative z-direction. After passing through quadrant I of wedge 130, light beam 01b is deflected to travel in the negative z-direction and somewhat in the negative y-direction (FIG. 3e(2)). Thereafter, light beam 01b enters quadrant I of non-reciprocal device 120 with the y-polarization, and exits from quadrant I with the x-polarization. Finally, light beam 01b enters quadrant I of birefringent crystal 110, is deflected in the negative x-direction, and enters dual fiber collimator 100 with the x-polarization.

Light beams 01a and 01b enter collimator 100 respectively with the y-polarization and the x-polarization, are combined at collimator 100, and exit from port 1.

FIGS. 4a, 4b, 4c, 4d, and 4e, shown in the y-z plane, show the optical paths traveled by the light beams respectively in FIGS. 3a(3), 3b(3), 3c(3), 3d(3), and 3e(3). FIG. 4f shows the optical paths in the x-z plane. FIGS. 4a–4e show the paths traveled by light beams introduced at ports 1, 2, 3, and 4, and at extension interfaces 0a and 0u, respectively. In each figure, the actual paths traveled by light beams are represented by arrow lines.

FIG. 4a shows that an optical signal introduced at port 1 is separated into light beams 12a and 12b, and light beams 12a and 12b are recombined to exit from port 2. FIG. 4b shows that an optical signal introduced at port 2 is separated into light beams 23a and 23b, and light beams 23a and 23b are recombined to exit from port 3. FIG. 4c shows that an optical signal introduced at port 3 is separated into light beams 34a and 34b, and light beams 34a and 34b are recombined to exit from port 4. FIG. 4d shows that an optical signal introduced at port 4 is separated into light beams 45a and 45b, and light beams 45a and 45b exit respectively from extension interfaces 5a and 5b. FIG. 4e shows that light beams 01a and 01b enter respectively extension interfaces 0a and 0b, and are combined to exit from port 1.

FIG. 5 shows three extendable four-port circulators 555', 555, and 555" cascaded together to form twelve-port circulator 1000. Extension interfaces 5a' and 5b' of circulator 555' (not shown) are respectively coupled to extension interfaces 0a and 0b of circulator 555 (not shown) by directly contacting surface 144' of circulator 555' with surface 142 of circulator 555. In one implementation, extension interfaces 5a and 5b of circulator 555 (not shown) are respectively coupled to extension interfaces 0a" and 0b" of circulator 555" (not shown) by directly contacting surface 144 of circulator 555 with surface 142" of circulator 555". Extension interfaces 0a' and 0b' on surface 142' (not shown) of circulator 555' and extension interfaces 5a" and 5b" on surface 144" (not shown) of circulator 555" are not used and therefore need not to be implemented. Birefringent crystal 140', 140, and 144" can be replaced with a single birefringent crystal 410.

FIG. 6 shows an alternative implementation of twelve-port circulator 1000. Twelve-port circulator 1000 includes four pair of reflectors: reflectors 311 and 312, reflectors 321 and 322, reflectors 511 and 512, and reflectors 521 and 522. Optical paths traveling in dual fiber collimator 100', birefringent crystal 110', non-reciprocal device 120', and wedge 130' are shifted together in the positive y-direction using reflectors 311 and 312. Optical paths traveling in wedge 150', nonreciprocal device 160', birefringent crystal 170', and dual fiber collimator 200 are shifted together in the positive y-direction using reflectors 321 and 322. Optical paths traveling in dual fiber collimator 100", birefringent crystal 110", non-reciprocal device 120", and wedge 130" are shifted together in the negative y-direction using reflectors 511 and 512. Finally, Optical paths traveling in wedge 150", non-reciprocal device 160", birefringent crystal 170", and dual fiber collimator 200" are shifted together in the negative y-direction using reflectors 521 and 522.

Alternative implementations of twelve-port circulator 1000 can also use one pair, two pair, or three pairs of reflectors, instead of four pairs. Further, a single reflector can be used to replace a pair of reflectors. For example, if only reflector 312 is used and reflector 311 is eliminated, it is possible to rotate together by 90 degrees the orientations of dual fiber collimator 100', birefringent crystal 110', non-reciprocal device 120', and wedge 130', such that the propagation direction of a light beam introduced at dual fiber collimator 100 is initially in the negative y-direction. In the implementations of twelve-port circulator 1000, reflectors, pairs of reflectors, or wedges may be generally referred to as path-conditioning components.

FIG. 7 shows another implementation of twelve-port circulator 1000 including at least one common component for replacing a group of individual components in FIG. 5. For example, birefringent crystals 110', 110, and 110" in FIG. 5 can be replaced with common birefringent crystal 101 in FIG. 7. Similarly, birefringent crystals 170', 170, and 170" can be replaced with common birefringent crystal 710. Non-reciprocal devices 120', 120, and 120" can be replaced with common non-reciprocal device 210. Non-reciprocal devices 160', 160, and 160" can be replaced with common non-reciprocal device 610.

As described above, the functions of each component in extendable four-port circulator 555 (FIG. 2) may depend on both the direction and the quadrant that a light beam enters. The construction of each component in extendable four-port circulator 555 of FIG. 2 is described below. The functions of each component, as a light beam travels in the positive z-direction, are described with respect to FIGS. 3a and 3c. Likewise, the function of each component, as a light beam travels in the negative z-direction, are described with respect to FIGS. 3b, 3d, and 3e.

Birefringent crystal 110 is constructed and orientated in such a way to perform the following functions: (1) light passing through birefringent crystal 110 in the positive z-direction with the y-polarization will not be deflected, and light with the x-polarization will be deflected in the positive x-direction; (2) light passing through birefringent crystal 110 in the negative z-direction with the y-polarization will not be deflected, and light beam with the x-polarization will be deflected in the negative x-direction. Accordingly, birefringent crystal 110 splits or joins light beams in accordance with their respective polarizations. The polarization of the o-ray in birefringent crystal 110 is in the y-direction.

Non-reciprocal device 120 is constructed to perform the following functions: (1) light passing through non-reciprocal device 120 in the positive z-direction and entering device 120 through quadrant I or IV with the x-polarization remains as light with the x-polarization, and light entering device 120 through quadrant II or III with the y-polarization becomes light with the x-polarization; (2) light passing through non-reciprocal device 120 in the negative z-direction and entering device 120 through quadrant I or IV with the y-polarization will become light with the x-polarization, and light entering device 120 through quadrant II or III with the y-polarization remains as light with the y-polarization.

Birefringent crystal 140 is constructed and orientated in such a way to perform the following functions: (1) light passing through birefringent crystal 140 in the positive z-direction with the x-polarization will not be deflected; (2) light passing through birefringent crystal 140 in the negative z-direction with the y-polarization will be deflected in the negative y-direction. The polarization of the o-ray in birefringent crystal 140 is in the x-direction.

Non-reciprocal device 160 is constructed to perform the following functions: (1) light passing through non-reciprocal device 160 in the positive z-direction and entering device 160 through quadrant I or IV with the x-polarization will become light with the y-polarization, and light entering device 160 through quadrant II or III with the x-polarization remains as light with the x-polarization; (2) light passing through non-reciprocal device 160 in the negative z-direction and entering device 160 through quadrant I or IV with the y-polarization remain as light with the y-polarization, and light entering device 160 through quadrant II or III with the x-polarization will become light with the y-polarization.

One implementation of non-reciprocal device 120, as shown in FIGS. 8a and 8b, includes half wave plate 122 and Faraday rotators 125a and 125b. In one implementation, the optical axis of half wave plate 122 is in the direction of a vector rotated +22.5 degrees from the positive x-direction. When a light beam passes through Faraday rotator 125a, in either the positive or the negative z-directions, the polarization of the light beam will be rotated by +45 degrees with respect to the positive z-axis. When a light beam passes through Faraday rotator 125b, either in the positive or the negative z-directions, the polarization of the light beam will be rotated by −45 degrees with respect to the positive z-axis.

As shown in FIG. 8a, after passing through half wave plate 122 in the positive z-direction, a light beam with the x-polarization becomes a light beam with the x+y polarization, and a light beam with the y-polarization becomes a light beam with the x−y polarization. After passing through Faraday rotator 125a, a light beam with the x−y polarization, is rotated +45 degrees, and becomes a light beam with the x-polarization. Likewise, after passing through Faraday rotator 125b, a light beam with the x+y polarization, is rotated −45 degrees, and becomes a light beam with the x-polarization.

As shown in FIG. 8b, after passing through Faraday rotator 125a in the negative z-direction, a light beam with the y-polarization, is rotated +45 degrees, and becomes a light beam with the x−y polarization. A light beam with the x−y polarization, after passing through half wave plate 122, becomes a light beam with the y-polarization. After passing through Faraday rotator 125b in the negative z-direction, a light beam with the y-polarization, is rotated −45 degrees, and becomes a light beam with the x+y polarization. A light beam with the x+y polarization, after passing through half wave plate 122, becomes a light beam with the x-polarization.

In the implementations of FIGS. 8a and 8b, when the position of half wave plate 122 is exchanged with the position of Faraday rotators 125a and 125b, the functions of non-reciprocal device 120 remain the same. It is also possible to choose other optical axes for half wave plate 122 and other rotation directions for Faraday rotators 125a and 125b.

Another implementations of non-reciprocal device 120, as shown in FIGS. 9a and 9b, include half wave plates 122a and 122b and Faraday rotator 125. The optical axis of half wave plate 122a is in the direction of a vector rotated +22.5 degrees from the positive x-direction. The optical axis of half wave plate 122b is in the direction of a vector rotated −22.5 degrees from the positive x-direction. When a light beam passes through Faraday rotator 125, in either the positive or the negative z-directions, the polarization of the light beam will be rotated by +45 degrees.

As shown in FIG. 9a, a light beam with the y-polarization, after passing through half wave plate 122a in the positive z-direction becomes a light beam with the x+y polarization. Likewise, a light beam with the x-polarization, after passing through half wave plate 122b in the positive z-direction, becomes a light beam with the x−y polarization. The light beams with the x−y polarization, after passing through Faraday rotators 125, are rotated +45 degrees, become light beams with the x-polarization.

As shown in FIG. 9b, a light beam with the y-polarization, after passing through Faraday rotators 125 in the negative z-direction, is rotated +45 degrees and becomes light beams with the x−y polarization. A light beam with the x−y polarization, after passing through half wave plate 122a, becomes a light beam with the y-polarization. A light beam with the x−y polarization, after passing through half wave plate 122b, becomes a light beam with the y-polarization.

In the implementation of FIGS. 9a and 9b, when the position of half wave plates 122a and 122b is exchanged with the position of Faraday rotators 125, the functions of non-reciprocal device 120 remain the same. Other optical axes for half wave plate 122a and 122b and other rotation directions for Faraday rotator 125 can be selected.

Similar to non-reciprocal device 120, common non-reciprocal device 210 (in FIG. 7) can be constructed using one half wave plate in combination with two Faraday rotators, or using two half wave plates in combination with one Faraday rotator.

Non-reciprocal device 160 can be implemented in a number of different ways. One implementation of non-reciprocal device 160, as shown in FIGS. 10a and 10b, includes half wave plate 162 and Faraday rotators 165a and 165b. The optical axis of half wave plate 162 is in the direction of a vector rotated +22.5 degrees from the positive x-direction. When a light beam passes Faraday rotators 165a, in either the positive or the negative z-directions, the polarization of the light beam will be rotated by −45 degrees. When a light beam passes Faraday rotators 165b, either in the positive or the negative z-directions, the polarization of the light beam will be rotated by +45 degrees.

As shown in FIG. 10a, light beams with the x-polarization, after passing through half wave plate 162 in the positive z-direction, become light beams with the x+y polarization. A light beam with the x+y polarization, after passing through Faraday rotator 165a, is rotated −45 degrees, and becomes a light beam with the x-polarization. A light beam with the x+y polarization, after passing through Faraday rotator 165b, is rotated +45 degrees, and becomes a light beam with the y-polarization.

As shown in FIG. 10b, after passing through Faraday rotators 165a in the negative z-direction, a light beam with the x-polarization, rotated −45 degrees, become a light beam with the x−y polarization. Likewise, after passing through Faraday rotators 165b in the negative z-direction, a light beam with the y-polarization, rotated +45 degrees, become a light beam with the x−y polarization. The light beams with the x−y polarization, after passing through half wave plate 162, become light beams with the y-polarization.

In the implementation of FIGS. 10a and 10b, when the position of half wave plate 162 is exchanged with the position of Faraday rotators 165a and 165b, the functions of non-reciprocal device 160 remain the same. Other optical axes for half wave plate 162 and other rotation directions for Faraday rotators 165a and 165b.

Another implementation of non-reciprocal device 160, as shown in FIGS. 11a and FIG. 11b, includes half wave plates 162a and 162b and Faraday rotator 165. The optical axis of half wave plate 162a is in the direction of a vector rotated −22.5 degrees from the positive x-direction. The optical axis of half wave plate 162b is in the direction of a vector rotated +22.5 degrees from the positive x-direction. When a light beam passes through Faraday rotators 165, in either the positive or the negative z-directions, the polarization of the light beam will be rotated by +45 degrees.

As shown in FIG. 11a, a light beam with the x-polarization, after passing through half wave plate 162a in the positive z-direction, becomes a light beam with the x−y polarization. A light beam with the x-polarization, after passing through half wave plate 162b in the positive z-direction, becomes a light beam with the x+y polarization. After passing through Faraday rotator 165 and being rotated +45 degrees, a light beam with. the x−y polarization becomes a light beam with the x-polarization, and a light beam with the x+y polarization becomes a light beam with the y-polarization.

As shown in FIG. 11b, after passing through Faraday rotator 165 in the negative z-direction and being rotated +45 degrees, a light beam with the x-polarization becomes a light beam with the x+y polarization, and a light beam with the y-polarization becomes a light beam with the x−y polarization. After passing through half wave plate 162a, a light beam with the x+y polarization becomes a light beam with the y-polarization. Likewise, after passing through half wave plate 162b, a light beam with the x−y polarization becomes a light beam with the y-polarization.

In the implementation of FIGS. 11a and 11b, the position of half wave plates 162a and 162b can be exchanged with the position of Faraday rotator 165, and the functions of non-reciprocal device 160 remain unchanged. Other optical axes for half wave plate 162a and 162b and other rotation directions for Faraday rotator 165 can be selected.

Similar to non-reciprocal device 160, common non-reciprocal device 610 (in FIG. 7) can be constructed using one half wave plate in combination with two Faraday rotators, or using two half wave plates in combination with one Faraday rotator.

A method and system has been disclosed for providing extendable four-port circulators, which may be cascaded or combined to form a twelve-port circulator. Although the present invention has been described in accordance with the embodiments shown, one of ordinary skill in the art will readily recognize that there could be variations to the embodiments and those variations would be within the spirit and scope of the present invention. For example, two extendable four-port circulators can be cascaded or combined to form an eight-port circulator, and four can be cascaded or combined to form a sixteen-port circulator. In general, an integer number N of extendable four-port circulators can be cascaded or combined to form a 4N-port circulator. Accordingly, many modifications may be made by one of ordinary skill in the art without departing from the spirit and scope of the appended claims.

What is claimed is:

1. An extendable four-port circulator comprising:
   a first port;
   a second port;
   a third port;
   a fourth port;
   a first extension interface;
   wherein a signal provided to the first port exits at the second port,
   a signal provided to the second port exits at the third port,
   a signal provided to the third port exits at the fourth port and
   a signal provided to the first extension interface exits at the first port.

2. The circulator of claim 1 further comprising a second extension interface wherein a signal provided to the fourth port exits at the second extension interface.

3. The circulator of claim 2 further comprising:
   a birefringent crystal having first and second surfaces
   wherein the birefringent crystal's first surface includes the first extension interface and the second surface includes the second extension interface.

4. The circulator of claim 3 further comprising:
   a first and second fiber collimator
   wherein the first fiber collimator includes the first and third ports and the second fiber collimator includes the second and fourth ports.

5. An optical circulator system comprising:
   a plurality optical circulator modules, each optical circulator module comprising
      a first port;
      a second port;
      a third port;
      a fourth port;
      a first extension interface;
      a second extension interface;
   each optical circulator module configured such that
      a signal provided to the first port exits at the second port,
      a signal provided to the second port exits at the third port,
      a signal provided to the third port exits at the fourth port,
      a signal provided to the first extension interface exits at the first port, and
      a signal provided to the fourth port exits at the second extension interface, and a first optical circulator module's second extension interface communicates with a second adjacent optical circulator module's first extension interface.

6. The optical circulator system of claim 5 wherein the first optical circulator module's first extension interface communicates with the second adjacent optical circulator module's second extension interface.

7. The optical circulator system of claim 5 wherein the first optical circulator module's first extension interface communicates with a third adjacent optical circulator module's second extension interface.

8. The optical circulator system of claim 7 wherein the third adjacent optical circulator module's first extension interface communicates with the second optical circulator module's second extension interface.

9. The optical circulator system of claim 5 wherein each optical circulator module further comprises a birefringent crystal having a first and a second surface.

10. The optical circulator system of claim 9 wherein the first and second surface of each optical circulator module's birefringent crystal respectively includes the first and second extension interfaces.

11. The optical circulator system of claim 10 wherein a first optical circulator module's birefringent crystal is proximate to an adjacent circulator module's birefringent crystal.

* * * * *